(12) United States Patent
Willey et al.

(10) Patent No.: US 9,119,139 B2
(45) Date of Patent: *Aug. 25, 2015

(54) SYSTEM AND METHOD FOR FACILITATING ACCELERATED NETWORK SELECTION IN A RADIO NETWORK ENVIRONMENT

(71) Applicant: Research In Motion Limited, Waterloo (CA)

(72) Inventors: William Daniel Willey, San Francisco, CA (US); Adrian Buckley, Tracy, CA (US)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/859,834

(22) Filed: Apr. 10, 2013

(65) Prior Publication Data

US 2014/0018069 A1    Jan. 16, 2014

Related U.S. Application Data

(63) Continuation of application No. 11/712,536, filed on Feb. 28, 2007, now Pat. No. 8,428,586.

(60) Provisional application No. 60/802,008, filed on May 19, 2006.

(51) Int. Cl.
*H04Q 7/10* (2006.01)
*H04W 48/18* (2009.01)
*H04W 48/16* (2009.01)

(52) U.S. Cl.
CPC .............. *H04W 48/18* (2013.01); *H04W 48/16* (2013.01)

(58) Field of Classification Search
CPC ............................. H04W 48/18; H04W 48/16

USPC ......... 455/435.1, 435.2, 435.3, 436, 440, 441
See application file for complete search history.

(56) References Cited

U.S. PATENT DOCUMENTS

| 5,027,388 A | 6/1991 | Bradshaw |
| 5,420,914 A | 5/1995 | Blumhardt |

(Continued)

FOREIGN PATENT DOCUMENTS

| CA | 2504497 | 5/2004 |
| CN | 1270742 | 10/2000 |

(Continued)

OTHER PUBLICATIONS

CIPO, Office Action, Application No. 2,545,032, Sep. 10, 2013, 2 pgs.

(Continued)

*Primary Examiner* — Ajit Patel
*Assistant Examiner* — Julio Perez
(74) *Attorney, Agent, or Firm* — Fish & Richardson P.C.

(57) ABSTRACT

A method for facilitating accelerated network selection on a wireless user equipment (UE) device includes storing information regarding power-off time and power-off location as the UE device is about to enter a power-off condition. Upon power-up, the method further includes computing an estimated distance that the UE device has traveled while in the power-off condition using the stored information and a current time, defining a boundary that lies the estimated distance from a location indicated by the power-off location, for a plurality of regions lying within the boundary, logically sequencing acquisition records that are associated with the regions in a system acquisition database structure based on the regions nearness to the boundary, and locating a network via scanning using scanning data obtained from the logically sequenced acquisition records.

20 Claims, 9 Drawing Sheets

(56) References Cited

U.S. PATENT DOCUMENTS

| | | |
|---|---|---|
| 5,594,949 A | 1/1997 | Andersson et al. |
| 5,623,535 A | 4/1997 | Leung et al. |
| 5,659,601 A | 8/1997 | Cheslog |
| 5,701,585 A | 12/1997 | Kallin et al. |
| 5,790,952 A | 8/1998 | Seazholtz et al. |
| 5,862,480 A | 1/1999 | Wild et al. |
| 5,896,572 A | 4/1999 | Scotton |
| 5,915,214 A | 6/1999 | Reece et al. |
| 5,950,130 A | 9/1999 | Coursey |
| 5,953,665 A | 9/1999 | Mattila |
| 5,974,328 A | 10/1999 | Lee et al. |
| 5,983,115 A | 11/1999 | Mizikovsky |
| 5,999,811 A | 12/1999 | Molne |
| 6,044,141 A | 3/2000 | Ho et al. |
| 6,044,249 A | 3/2000 | Chandra et al. |
| 6,167,250 A | 12/2000 | Rahman |
| 6,223,042 B1 | 4/2001 | Raffel |
| 6,285,868 B1 | 9/2001 | LaDue |
| 6,324,400 B1 | 11/2001 | Shah et al. |
| 6,334,052 B1 | 12/2001 | Nordstrand |
| 6,347,091 B1 | 2/2002 | Wallentin et al. |
| 6,349,099 B1 | 2/2002 | Larikka et al. |
| 6,360,097 B1 | 3/2002 | Smith et al. |
| 6,385,454 B1 | 5/2002 | Bahl et al. |
| 6,385,460 B1 | 5/2002 | Wan |
| 6,404,761 B1 | 6/2002 | Snelling et al. |
| 6,405,038 B1 | 6/2002 | Barber et al. |
| 6,477,372 B1 | 11/2002 | Otting et al. |
| 6,501,951 B2 | 12/2002 | Moore |
| 6,522,735 B1 | 2/2003 | Fortman et al. |
| 6,542,716 B1 | 4/2003 | Dent et al. |
| 6,564,055 B1 | 5/2003 | Hronek |
| 6,608,832 B2 | 8/2003 | Forslow |
| 6,611,516 B1 | 8/2003 | Pirkola et al. |
| 6,625,451 B1 | 9/2003 | La Medica |
| 6,690,929 B1 | 2/2004 | Yeh |
| 6,728,267 B1 | 4/2004 | Giese et al. |
| 6,741,848 B2 | 5/2004 | Timonen |
| 6,769,000 B1 | 7/2004 | Akhtar et al. |
| 6,795,708 B1 | 9/2004 | Patel |
| 6,901,257 B2 | 5/2005 | Kubota |
| 6,950,655 B2 | 9/2005 | Hunkeler |
| 6,961,569 B2 | 11/2005 | Raghuram et al. |
| 6,985,733 B2 | 1/2006 | Binzel |
| 7,072,651 B2 | 7/2006 | Jiang et al. |
| 7,079,499 B1 | 7/2006 | Akhtar |
| 7,151,938 B2 | 12/2006 | Weigand et al. |
| 7,171,216 B1 | 1/2007 | Choksi |
| 7,209,709 B2 | 4/2007 | Miyazaki |
| 7,277,705 B2 | 10/2007 | Casaccia et al. |
| 7,414,997 B2 | 8/2008 | Lauer |
| 7,433,689 B2 | 10/2008 | Ishii |
| 7,519,365 B2 | 4/2009 | Dorsey et al. |
| 7,535,882 B2 | 5/2009 | Kim |
| 7,814,237 B2 | 10/2010 | Lee et al. |
| 7,937,083 B2 | 5/2011 | Oommen |
| 7,953,410 B2 | 5/2011 | Alfano et al. |
| 8,010,105 B2 | 8/2011 | Buckley et al. |
| 8,023,941 B2 | 9/2011 | Shaheen et al. |
| 8,060,084 B2 | 11/2011 | Buckley et al. |
| 8,185,103 B2 | 5/2012 | Alfano et al. |
| 8,194,826 B2 | 6/2012 | Bari |
| 8,229,431 B2 | 7/2012 | Buckley et al. |
| 8,238,980 B1 | 8/2012 | Shusterman |
| 8,301,143 B2 | 10/2012 | Iwamura et al. |
| 8,315,627 B2 | 11/2012 | Poyhonen et al. |
| 8,346,257 B2 | 1/2013 | Kazmi et al. |
| 8,428,584 B2 | 4/2013 | Buckley et al. |
| 8,428,586 B2 | 4/2013 | Willey et al. |
| 8,538,431 B2 | 9/2013 | Obata et al. |
| 8,611,280 B2 | 12/2013 | Morera et al. |
| 8,744,443 B2 | 6/2014 | Buckley et al. |
| 8,818,449 B2 | 8/2014 | Buckley et al. |
| 2001/0006892 A1 | 7/2001 | Barnett et al. |
| 2002/0059453 A1 | 5/2002 | Eriksson |
| 2002/0082044 A1 | 6/2002 | Davenport |
| 2002/0101858 A1 | 8/2002 | Stuart |
| 2002/0102973 A1 | 8/2002 | Rosenberg |
| 2002/0119774 A1 | 8/2002 | Johannesson |
| 2002/0168976 A1 | 11/2002 | Krishnan |
| 2002/0178118 A1 | 11/2002 | Hamilton |
| 2003/0003922 A1 | 1/2003 | McClure |
| 2003/0017828 A1 | 1/2003 | Kotzin |
| 2003/0118015 A1 | 6/2003 | Gunnarsson et al. |
| 2003/0120541 A1 | 6/2003 | Siann |
| 2003/0142641 A1 | 7/2003 | Sumner |
| 2003/0158922 A1 | 8/2003 | Park |
| 2003/0232595 A1 | 12/2003 | Baker et al. |
| 2004/0017798 A1 | 1/2004 | Hurtta |
| 2004/0058679 A1 | 3/2004 | Dillinger et al. |
| 2004/0076130 A1 | 4/2004 | Uchida et al. |
| 2004/0087305 A1 | 5/2004 | Jiang et al. |
| 2004/0093398 A1 | 5/2004 | Tang |
| 2004/0110523 A1 | 6/2004 | Ishii |
| 2004/0116132 A1 | 6/2004 | Hunzinger et al. |
| 2004/0162058 A1 | 8/2004 | Mottes |
| 2004/0165657 A1 | 8/2004 | Simic et al. |
| 2004/0192304 A1 | 9/2004 | Casaccia et al. |
| 2004/0192306 A1 | 9/2004 | Elkarat et al. |
| 2004/0192328 A1 | 9/2004 | Giacalone et al. |
| 2004/0203893 A1 | 10/2004 | Kotzin |
| 2004/0224689 A1 | 11/2004 | Raghuram et al. |
| 2004/0233868 A1 | 11/2004 | Farnham |
| 2004/0235476 A1 | 11/2004 | Martlew |
| 2004/0248585 A1 | 12/2004 | Karacaoglu |
| 2004/0249915 A1* | 12/2004 | Russell ...................... 709/223 |
| 2004/0252656 A1 | 12/2004 | Shiu et al. |
| 2005/0020280 A1 | 1/2005 | Holland et al. |
| 2005/0055371 A1 | 3/2005 | Sunder et al. |
| 2005/0063334 A1 | 3/2005 | Fnu et al. |
| 2005/0070279 A1 | 3/2005 | Ginzburg et al. |
| 2005/0085182 A1 | 4/2005 | Chuberre et al. |
| 2005/0130591 A1 | 6/2005 | Bouchired et al. |
| 2005/0130672 A1 | 6/2005 | Dean et al. |
| 2005/0141464 A1 | 6/2005 | Willey et al. |
| 2005/0202828 A1 | 9/2005 | Pecen et al. |
| 2005/0227720 A1 | 10/2005 | Gunaratnam et al. |
| 2005/0282544 A1 | 12/2005 | Oommen et al. |
| 2006/0009216 A1* | 1/2006 | Welnick et al. ............... 455/434 |
| 2006/0030318 A1 | 2/2006 | Moore et al. |
| 2006/0068781 A1 | 3/2006 | Lam |
| 2006/0072507 A1 | 4/2006 | Chandra et al. |
| 2006/0073827 A1 | 4/2006 | Vaisanen et al. |
| 2006/0077924 A1 | 4/2006 | Rune |
| 2006/0104211 A1 | 5/2006 | Islam et al. |
| 2006/0114871 A1 | 6/2006 | Buckley et al. |
| 2006/0171304 A1 | 8/2006 | Hill |
| 2006/0217147 A1 | 9/2006 | Olvera-Hernandez et al. |
| 2006/0234705 A1 | 10/2006 | Oommen |
| 2006/0245392 A1 | 11/2006 | Buckley et al. |
| 2006/0246889 A1 | 11/2006 | Buchhop et al. |
| 2006/0246899 A1 | 11/2006 | Buckley et al. |
| 2007/0004404 A1 | 1/2007 | Buckley et al. |
| 2007/0004405 A1 | 1/2007 | Buckley et al. |
| 2007/0011699 A1 | 1/2007 | Kopra et al. |
| 2007/0054665 A1 | 3/2007 | Elkarat et al. |
| 2007/0202875 A1 | 8/2007 | Dorsey et al. |
| 2007/0268877 A1 | 11/2007 | Buckley et al. |
| 2007/0270142 A1 | 11/2007 | Willey et al. |
| 2007/0298790 A1 | 12/2007 | Ormson et al. |
| 2008/0032736 A1 | 2/2008 | Bari |
| 2008/0039082 A1 | 2/2008 | Kim |
| 2008/0139204 A1 | 6/2008 | Hsieh et al. |
| 2008/0200169 A1 | 8/2008 | Gao |
| 2009/0156215 A1 | 6/2009 | Pitkamaki |
| 2009/0222566 A1 | 9/2009 | Murakami |
| 2010/0156706 A1* | 6/2010 | Farmer et al. .............. 342/357.1 |
| 2011/0176424 A1 | 7/2011 | Yang et al. |
| 2011/0244887 A1* | 10/2011 | Dupray et al. ............. 455/456.2 |
| 2011/0294531 A1 | 12/2011 | Buckley |
| 2012/0039325 A1 | 2/2012 | Buckley et al. |
| 2012/0040666 A1 | 2/2012 | Buckley et al. |
| 2013/0072190 A1 | 3/2013 | Pitkamaki |
| 2013/0225164 A1 | 8/2013 | Buckley et al. |

(56) References Cited

U.S. PATENT DOCUMENTS

| | | |
|---|---|---|
| 2014/0051437 A1 | 2/2014 | Diachina et al. |
| 2014/0051443 A1 | 2/2014 | Diachina et al. |
| 2014/0086177 A1 | 3/2014 | Adjakple et al. |

FOREIGN PATENT DOCUMENTS

| | | |
|---|---|---|
| CN | 1430840 | 7/2003 |
| EP | 0781064 | 6/1997 |
| EP | 1213941 | 6/2002 |
| EP | 1104975 | 7/2004 |
| EP | 1460873 | 9/2004 |
| EP | 1641292 | 3/2006 |
| EP | 1703756 | 9/2006 |
| GB | 2352586 | 1/2001 |
| GB | 2353648 | 2/2001 |
| JP | 2001008251 | 1/2001 |
| JP | 2001211184 | 8/2001 |
| JP | 2001235532 | 8/2001 |
| JP | 2002232930 | 6/2002 |
| JP | 2002236165 | 8/2002 |
| JP | 2002286492 | 10/2002 |
| JP | 2005143088 | 6/2005 |
| KR | 1020040090336 | 10/2004 |
| KR | 1020040096612 | 11/2004 |
| SG | 178817 | 3/2012 |
| WO | 0041486 | 7/2000 |
| WO | 0105174 | 1/2001 |
| WO | 0145446 | 6/2001 |
| WO | 0162034 | 8/2001 |
| WO | 03053086 | 6/2003 |
| WO | 03096578 | 11/2003 |
| WO | 2004014101 | 2/2004 |
| WO | 2004014862 | 2/2004 |
| WO | 2004047476 | 6/2004 |
| WO | 2004073338 | 8/2004 |
| WO | 2004077860 | 9/2004 |
| WO | 2004081600 | 9/2004 |
| WO | 2004089031 | 10/2004 |
| WO | 2005002140 | 1/2005 |
| WO | 2005018140 | 2/2005 |
| WO | 2005027557 | 3/2005 |
| WO | 2006007218 | 1/2006 |
| WO | 2006044024 | 4/2006 |

OTHER PUBLICATIONS

CIPO, Notice of Allowance, Application No. 2,589,948, Aug. 8, 2013, 1 pg.
SIPO, Rejection Decision, Application No. 200610077264.2, Jul. 2, 2012, 11 pgs. 0.
SIPO, First Office Action, Application No. 200610110892.6, Jan. 15, 2010, 4 pgs.
SIPO, Second Office Action, Application No. 200610110892.6, Jul. 12, 2010, 4 pgs.
SIPO, Third Office Action, Application No. 200610110892.6, Sep. 10, 2010, 6 pgs.
SIPO, Rejection Decision, Application No. 200610110892.6, Jan. 26, 2011, 8 pgs.
SIPO, First Office Action, Application No. 200610143754.8, Jan. 8, 2010, 8 pgs.
SIPO, Notification of Grant of Rights, Application No. 200610143754.8, Nov. 3, 2010, 2 pgs.
TIPO, Search Report, Application No. 095115179, Feb. 1, 2011, 1 pg.
TIPO, Office Action, Application No. 095115179, Mar. 10, 2011, 2 pgs.
TIPO, Search Report, Application No. 095115180, Feb. 22, 2011, 1 pg.
TIPO, Office Action, Application No. 095115180, Feb. 25, 2011, 2 pgs.
TIPO, Office Action, Application No. 095124093, Jan. 22, 2010, 7 pgs.
TIPO, Decision of the Intellectual Property Office, Application No. 095124093, Oct. 27, 2010, 3 pgs.
TIPO, Office Action, Application No. 095124095, May 30, 2011, 3 pgs.
USPTO, Office Action, U.S. Appl. No. 11/116,461, Oct. 13, 2006, 10 pgs.
USPTO, Office Action, U.S. Appl. No. 11/116,461, Mar. 29, 2007, 10 pgs.
USPTO, Advisory Action, U.S. Appl. No. 11/116,461, Jul. 11, 2007, 3 pgs.
USPTO, Office Action, U.S. Appl. No. 11/116,461, Sep. 25, 2007, 13 pgs.
USPTO, Office Action, U.S. Appl. No. 11/116,461, Feb. 6, 2008, 15 pgs.
USPTO, Office Action, U.S. Appl. No. 11/116,461, Jul. 2, 2008, 14 pgs.
USPTO, Office Action, U.S. Appl. No. 11/116,461, Feb. 24, 2009, 16 pgs.
USPTO, Office Action, U.S. Appl. No. 11/116,461, May 29, 2009, 15 pgs.
USPTO, Office Action, U.S. Appl. No. 11/116,461, Sep. 17, 2009, 16 pgs.
USPTO, Office Action, U.S. Appl. No. 11/116,461, Jan. 19, 2010, 14 pgs.
USPTO, Office Action, U.S. Appl. No. 11/116,461, Sep. 14, 2010, 14 pgs.
USPTO, Office Action, U.S. Appl. No. 11/116,461, Feb. 14, 2011, 15 pgs.
USPTO, Notice of Allowance, U.S. Appl. No. 11/116,461, Jul. 1, 2011, 7 pgs.
USPTO, Supplemental Notice of Allowance, U.S. Appl. No. 11/116,461, Sep. 21, 2011, 3 pgs.
USPTO, Office Action, U.S. Appl. No. 11/116,470, Apr. 15, 2008, 12 pgs.
USPTO, Office Action, U.S. Appl. No. 11/116,470, Oct. 17, 2008, 11 pgs.
USPTO, Office Action, U.S. Appl. No. 11/116,470, Mar. 5, 2009, 6 pgs.
USPTO, Office Action, U.S. Appl. No. 11/116,470, Aug. 12, 2009, 6 pgs.
USPTO, Office Action, U.S. Appl. No. 11/116,470, Jan. 28, 2010, 8 pgs.
USPTO, Office Action, U.S. Appl. No. 11/116,470, Jul. 21, 2010, 7 pgs.
USPTO, Advisory Action, U.S. Appl. No. 11/116,470, Feb. 2, 2011, 3 pgs.
USPTO, Office Action, U.S. Appl. No. 11/116,470, Mar. 28, 2011, 6 pgs.
USPTO, Office Action, U.S. Appl. No. 11/173,040, Sep. 26, 2007, 17 pgs.
USPTO, Office Action, U.S. Appl. No. 11/173,040, Apr. 1, 2008, 12 pgs.
USPTO, Office Action, U.S. Appl. No. 11/173,040, Apr. 6, 2009, 10 pgs.
USPTO, Office Action, U.S. Appl. No. 11/173,040, Nov. 16, 2009, 12 pgs.
USPTO, Office Action, U.S. Appl. No. 11/173,040, May 14, 2010, 12 pgs.
USPTO, Office Action, U.S. Appl. No. 11/173,040, Nov. 10, 2010, 14 pgs.
USPTO, Office Action, U.S. Appl. No. 11/173,040, Jun. 23, 2011, 13 pgs.
USPTO, Office Action, U.S. Appl. No.. 11/173,083, Mar. 25, 2008, 7 pgs.
USPTO, Office Action, U.S. Appl. No. 11/173,083, Jun. 27, 2008, 10 pgs.
USPTO, Office Action, U.S. Appl. No. 11/173,083, Jul. 10, 2009, 12 pgs.
USPTO, Office Action, U.S. Appl. No. 13/282,020, Sep. 12, 2013, 7 pgs.
USPTO, Notice of Publication, U.S. Appl. No. 13/859,890, Aug. 29, 2013, 1 pg.

(56) References Cited

OTHER PUBLICATIONS

CIPO, Office Action, Application No. 2,551,238, Jun. 12, 2009, 4 pgs.
CIPO, Office Action, Application No. 2,551,238, Jan. 25, 2011, 2 pgs.
CIPO, Notice of Allowance, Application No. 2,551,238, Oct. 11, 2011, 1 pg.
CIPO, Office Action, Application No. 2,551,241, Nov. 23, 2009, 4 pgs.
CIPO, Office Action, Application No. 2,551,241, Mar. 9, 2011, 2 pgs.
CIPO, Notice of Allowance, Application No. 2,551,241, Mar. 30, 2012, 1 pg.
CIPO, Office Action, Application No. 2,545,032, Oct. 21, 2008, 2 pgs.
CIPO, Office Action, Application No. 2,545,032, Jul. 15, 2010, 3 pgs.
CIPO, Office Action, Application No. 2,545,032, Jul. 18, 2012, 3 pgs.
CIPO, Office Action, Application No. 2,545,035, Feb. 26, 2010, 4 pgs.
CIPO, Office Action, Application No. 2,545,035, Jul. 11, 2011, 2 pgs.
CIPO, Office Action, Application No. 2,589,948, Oct. 7, 2009, 3 pgs.
CIPO, Office Action, Application No. 2,589,948, Jul. 12, 2010, 2 pgs.
CIPO, Office Action, Application No. 2,589,948, Sep. 2, 2011, 4 pgs.
CIPO, Office Action, Application No. 2,589,948, May 15, 2012, 2 pgs.
CIPO, Office Action, Application No. 2,589,961, Jul. 6, 2010, 6 pgs.
CIPO, Office Action, Application No. 2,589,961, Jul. 19, 2011, 4 pgs.
CIPO, Office Action, Application No. 2,589,961, Nov. 28, 2012, 5 pgs.
CIPO, Notice of Allowance, Application No. 2,589,961, May 28, 2013, 1 pg.
EPO, Search Report, Application No. 05252665.4, Sep. 13, 2005, 6 pgs.
EPO, Communication Pursuant to Article 96(2) EPC, Application No. 05252665.4, Mar. 30, 2006, 3 pgs.
EPO, Search Report, Application No. 05252666.2, Sep. 6, 2005, 7 pgs.
EPO, Communication Pursuant to Article 94(3) EPC, Application No. 05252666.2, Apr. 21, 2008, 5 pgs.
EPO, Communication Under Rule 71(3) EPC, Application No. 07103266.8, Dec. 4, 2012, 6 pgs.
EPO, Search Report, Application No. 07120521.5, Dec. 19, 2007, 4 pgs.
EPO, Communication Pursuant to Article 94(3) EPC, Application No. 07120521.5, Aug. 6, 2008, 2 pgs.
EPO, Communication Pursuant to Article 94(3) EPC, Application No. 07120521.5, Apr. 7, 2009, 4 pgs.
EPO, Search Report, Application No. 09151437.2, Apr. 8, 2009, 5 pgs.
IP Australia, Examiner's First Report, Application No. 2006201729, Jan. 6, 2010, 2 pgs.
IP Australia, Notice of Acceptance, Application No. 2006201729, Jul. 13, 2010, 3 pgs.
IP Australia, Examiner's First Report, Application No. 2006201730, Nov. 10, 2009, 4 pgs.
IP Australia, Notice of Acceptance, Application No. 2006201730, Aug. 16, 2010, 3 pgs.
IP Australia, Examiner's First Report, Application No. 2010241215, Aug. 23, 2012, 2 pgs.
IP Australia, Notice of Acceptance, Application No. 2010241215, Oct. 25, 2012, 3 pgs.
JPO, Notice of Reasons for Rejection, Application No. 2006122719, Jun. 7, 2011, 4 pgs.
JPO, Notice of Reasons for Rejection, Application No. 2006122719, Sep. 30, 2011, 3 pgs.
JPO, Notice of Reasons for Rejection, Application No. 2006122735, Jun. 7, 2011, 3 pgs.
JPO, Notice of Reasons for Rejection, Application No. 2011289379, Nov. 30, 2012, 3 pgs.
KIPO, Office Action, Application No. 1020060038142, Jun. 19, 2012, 3 pgs.
KIPO, Notice of Allowance, Application No. 1020060038142, Jun. 26, 2013, 3 pgs.
KIPO, Office Action, Application No. 1020060038143, Jul. 27, 2012, 8 pgs.
KIPO, Notice of Allowance of Patent, Application No. 1020060038143, Jan. 31, 2013, 1 pg.
KIPO, Office Action, Application No. 1020060062200, Dec. 26, 2012, 6 pgs.
KIPO, Notice of Allowance of Patent, Application No. 1020060062202, Feb. 15, 2013, 3 pgs.
USPTO, Office Action, U.S. Appl. No. 11/173,083, Jun. 20, 2012, 38 pgs.
USPTO, Notice of Allowance and Fee(s) Due, U.S. Appl. No. 11/173,083, Dec. 17, 2012, 7 pgs.
USPTO, Notice of Allowance and Fee(s) Due, U.S. Appl. No. 11/712,536, Dec. 24, 2012, 9 pgs.
USPTO, Interview Summary, U.S. Appl. No. 13/208,048, Mar. 13, 2013, 3 pgs.
USPTO, Office Action, U.S. Appl. No. 13/208,048, May 14, 2013, 21 pgs.
USPTO, Office Action, U.S. Appl. No. 13/279,903, Apr. 15, 2013, 13 pgs.
USPTO, Office Action, U.S. Appl. No. 13/282,020, Feb. 24, 2014, 9 pgs.
USPTO, Supplemental Notice of Allowability, U.S. Appl. No. 13/208,048, Apr. 2, 2014, 2 pgs.
USPTO, Office Action, U.S. Appl. No. 13/859,890, Apr. 10, 2014, 12 pgs.
USPTO, Notice of Allowance and Fee(s) Due, U.S. Appl. No. 13/282,020, Apr. 14, 2014, 7 pgs.
CIPO, Office Action, Application No. 2,545,032, Jun. 20, 2014, 3 pgs.
Taiwan, Search Report, Application No. 100120631, Jun. 12, 2014, 1 pg.
IPO Taiwan, Office Action, Application No. 100120019, Nov. 26, 2013, 4 pgs.
EPO, Communication under Rule 71(3) EPC, Application No. 07108490.9, Sep. 23, 2013, 6 pgs.
USPTO, Office Action, U.S. Appl. No. 11/173,083, Jan. 22, 2010, 11 pgs.
USPTO, Office Action, U.S. Appl. No. 11/173,083, Dec. 21, 2010, 12 pgs.
USPTO, Office Action, U.S. Appl. No. 11/712,536, Mar. 9, 2010, 16 pgs.
USPTO, Office Action, U.S. Appl. No. 11/712,536, Aug. 16, 2010, 18 pgs.
USPTO, Office Action, U.S. Appl. No. 11/712,536, Apr. 4, 2011, 18 pgs.
USPTO, Office Action, U.S. Appl. No. 11/712,536, Oct. 26, 2011, 21 pgs.
USPTO, Advisory Action, U.S. Appl. No. 11/712,536, Jan. 3, 2012, 3 pgs.
USPTO, Office Action, U.S. Appl. No. 11/750,417, Jan. 5, 2010, 16 pgs.
USPTO, Office Action, U.S. Appl. No. 11/750,417, May 14, 2010, 17 pgs.
USPTO, Interview Summary, U.S. Appl. No. 11/750,417, Oct. 27, 2010, 3 pgs.
USPTO, Notice of Allowance, U.S. Appl. No. 11/750,417, Apr. 15, 2011, 5 pgs.
USPTO, Notice of Publication, U.S. Appl. No. 13/208,048, Dec. 1, 2011, 1 pg.
USPTO, Office Action, U.S. Appl. No. 13/208,048, Apr. 5, 2012, 15 pgs.
USPTO, Office Action, U.S. Appl. No. 13/208,048, Sep. 24, 2012, 16 pgs.
USPTO, Notice of Panel Decision from Pre-Appeal Brief Review, U.S. Appl. No. 13/208,048, Jan. 17, 2013, 2 pgs.
USPTO, Final Office Action, U.S. Appl. No. 13/208,048, Sep. 26, 2013, 23 pgs.
USPTO, Office Action, U.S. Appl. No. 13/279,903, Feb. 9, 2012, 13 pgs.

(56) References Cited

OTHER PUBLICATIONS

USPTO, Notice of Publication, U.S. Appl. No. 13/279,903, Feb. 16, 2012, 1 pg.
USPTO, Office Action, U.S. Appl. No. 13/279,903, May 21, 2012, 16 pgs.
USPTO, Notice of Publication, U.S. Appl. No. 13/282,020, Feb. 16, 2012, 1 pg.
Publication: 3GPP, S2-034121, "PLMN and Core Network Operator Selections," Nokia, Siemens, TeliaSonera, Nov. 28, 2003, 5 pgs.
Publication: 3GPP, TR 21.905, V 4.4.0, Technical Specification Group Services and System Aspects; Vocabulary for 3GPP Specifications, Oct. 31, 2001, 48 pgs.
CIPO, Office Action, Application No. 2,589,961, Mar. 1, 2012, 4 pgs.
EPO, Search Report, Application No. 05254146.3, Nov. 21, 2005, 5 pgs.
EPO, Extended Search Report, Application No. 05254146.3, Feb. 21, 2006, 10 pgs.
EPO, Communication Pursuant to Article 94(3) EPC, Application No. 05254146.3, Jun. 16, 2009, 3 pgs.
EPO, Search Report, Application No. 05254147.1, Nov. 15, 2005, 5 pgs.
EPO, Search Report, Application No. 05254147.1, Feb. 7, 2006, 6 pgs.
EPO, Communication Pursuant to Article 96(2) EPC, Application No. 05254147.1, Feb. 22, 2006, 13 pgs.
EPO, Communication Pursuant to Article 96(2) EPC, Application No. 05254147.1, Dec. 14, 2006, 7 pgs.
EPO, Decision to Grant a European Patent Pursuant to Article 97(1) EPC, Application No. 05254147.1, Feb. 14, 2008, 1 pg.
EPO, Extended Search Report, Application No. 06126929.6, Mar. 8, 2007, 4 pgs.
EPO, Communication Pursuant to Article 96(2) EPC, Application No. 06126929.6, Oct. 25, 2007, 1 pg.
EPO, Extended Search Report, Application No. 07103266.8, Jul. 19, 2007, 8 pgs.
EPO, Communication Pursuant to Article 94(3) EPC, Application No. 07103266.8, Jul. 31, 2008, 4 pgs.
EPO, Extended Search Report, Application No. 07108490.9; Nov. 2, 2007, 10 pgs.
EPO, Communication Pursuant to Article 94(3) EPC, Application No. 07108490.9, Mar. 20, 2008, 1 pg.
EPO, Communication Pursuant to Article 94(3) EPC, Application No. 07108490.9, Feb. 16, 2010, 5 pgs.
EPO, Search Report, Application No. 07111440.9, Sep. 24, 2007, 7 pgs.
EPO, Communication Pursuant to Article 94(3) EPC, Application No. 07111440.9, Dec. 19, 2007, 3 pgs.
EPO, Communication Pursuant to Article 94(3) EPC, Application No. 07111440.9, Nov. 12, 2008, 6 pgs.
EPO, Communication Pursuant to Article 94(3) EPC, Application No. 07111440.9, Apr. 13, 2010, 6 pgs.
EPO, Decision to Grant, Application No. 07111440.9, Feb. 3, 2011, 1 pg.
EPO, Search Report, Application No. 07111443.3, Oct. 2, 2007, 7 pgs.
EPO, Communication Pursuant to Article 94(3) EPC, Application No. 07111443.3, Jan. 31, 2008, 1 pg.
EPO, Communication Pursuant to Article 94(3) EPC, Application No. 07111443.3, Sep. 29, 2008, 3 pgs.
EPO, Extended Search Report, Application No. 07111447.4, Aug. 7, 2007, 8 pgs.
EPO, Communication Pursuant to Article 94(3) EPC, Application No. 07111447.4, Jan. 31, 2008, 1 pg.
EPO, Communication Pursuant to Article 94(3) EPC, Application No. 07111447.4, Nov. 5, 2008, 6 pgs.
EPO, Decision to Grant, Application No. 07111447.4, Oct. 1, 2009, 1 pg.
EPO, Extended Search Report, Application No. 08172106.0, Feb. 11, 2009, 11 pgs.
EPO, Communication Pursuant to Article 94(3) EPC, Application No. 08172106.0, Oct. 7, 2009, 1 pg.
IP Australia, Examinees First Report, Application No. 2005202767, Jul. 7, 2009, 1 pg.
IP Australia, Notice of Acceptance, Application No. 2005202767, Jul. 5, 2010, 3 pgs.
IP Australia, Examiner's First Report, Application No. 2006202765, Apr. 19, 2010, 2 pgs.
IP Australia, Examiner's Second Report, Application No. 2006202765, Nov. 1, 2010, 2 pgs.
IP Australia, Notice of Acceptance, Application No. 2006202765, May 11, 2011, 3 pgs.
IP India, Examination Report, Application No. 1538/DEL/2006, Dec. 15, 2011, 1 pg.
IP India, First Examination Report, Application No. 1539/DEL/2006, Mar. 5, 2012, 2 pgs.
IPOS, Certification of Grant, Application No. 2006044663, Dec. 31, 2008, 1 pg.
JPO, Notice of Reasons for Rejection, Application No. 2006180361, Aug. 18, 2011, 6 pgs.
JPO, Notice of Reasons for Rejection, Application No. 2006180363, Aug. 19, 2011, 5 pgs.
KIPO, Notice of Allowance, Application No. 1020060062200, Jul. 15, 2013, 3 pgs.
KIPO, Office Action, Application No. 1020060062202, Sep. 27, 2012, 3 pgs.
SIPO, First Office Action, Application No. 200610077263.8, Mar. 2, 2010, 6 pgs.
SIPO, Second Office Action, Application No. 200610077263.8, Aug. 11, 2010, 7 pgs.
SIPO, Rejection Decision, Application No. 200610077263.8, Nov. 24, 2011, 5 pgs.
SIPO, Reexamination Office Action, Application No. 200610077263.8, Jul. 19, 2013, 9 pgs.
SIPO, First Office Action, Application No. 200610077264.2, Dec. 5, 2008, 10 pgs.
SIPO, Second Office Action, Application No. 200610077264.2, Dec. 24, 2010, 9 pgs.
SIPO, Third Office Action, Application No. 200610077264.2, Jan. 31, 2012, 8 pgs.
USPTO, Final Office Action, U.S. Appl. No. 13/279,903, Jul. 23, 2013, 15 pgs.
IP India, First Examination Report, Application No. 1074/DEL/2006, Sep. 26, 2013, 2 pgs.
USPTO, Notice of Allowance, U.S. Appl. No. 13/208,048, Dec. 6, 2013, 7 pgs.
CIPO, Office Action, Application No. 2,545,035, Dec. 6, 2013, 4 pgs.
IP India, First Examination Report, Application No. 1073/DEL/2006, Oct. 15, 2013, 2 pgs.
USPTO, Office Action, U.S. Appl. No. 13/859,890, Aug. 7, 2014, 16 pgs.
Taiwan Office Action; Application No. 095124095; IPO Taiwan; Jan. 22, 2010; 7 pages.
USPTO, Advisory Action, U.S. Appl. No. 11/750,417, Sep. 30, 2010, 3 pgs.
USPTO, Supplemental Notice of Allowance, U.S. Appl. No. 11/116,470, Sep. 21, 2011, 3 pgs.
USPTO, Advisory Action, U.S. Appl. No. 13/859,890, Oct. 22, 2014, 3 pgs.
USPTO, Applicant-Initiated Interview Summary, U.S. Appl. No. 13/859,890, Oct. 31, 2014, 3 pgs.
USPTO, Office Action, U.S. Appl. No. 13/859,890, Dec. 16, 2014, 12 pgs.

* cited by examiner

| REGION 202 | SID 204 | NID_INCL 206 | PREF_NEG 208 | GEO | PRI 210 | ACQ_INDEX (ACQ_TYPE) 212 214 | ROAM_IND 216 | Flag 218 |
|---|---|---|---|---|---|---|---|---|
| REGION A | 111 | 0 | 1 | 0 | 1 | 2[Cellular CDMA-Standard Channels] | Off | |
| | 77 | 0 | 1 | 1 | 0 | 0[PCS CDMA-Using Channels] | Off | |
| | 34 | 0 | 1 | 1 | 0 | 2[Cellular CDMA-Standard Channels] | Flashing | |
| | | 0 | 0 | 1 | N/A | 4[Cellular Analog] | N/A | |
| REGION B | 400 | 0 | 1 | 0 | 1 | 2[Cellular CDMA-Standard Channels] | Off | |
| | 4 | 0 | 1 | 1 | 1 | 0[PCS CDMA-Using Channels] | On | |
| | 12 | 0 | 1 | 1 | 1 | 3[Cellular CDMA-Custom Channels] | On | |
| | 0 | 0 | 1 | 1 | 0 | 4(Cellular Analog) | On | |
| | 776 | 0 | 0 | 1 | N/A | 4[Cellular Analog] | N/A | |
| REGION C | 61 | 0 | 1 | 0 | 1 | 2[Cellular CDMA-Standard Channels] | Off | |
| | 56 | 0 | 1 | 1 | 0 | 1[PCS CDMA-Using Blocks] | Flashing | |
| | 16 | 0 | 0 | 1 | N/A | 4[Cellular Analog] | N/A | |

SYSTEM AND METHOD FOR FACILITATING ACCELERATED NETWORK SELECTION IN A RADIO NETWORK ENVIRONMENT

PRIORITY UNDER 35 U.S.C. §119(e) & 37 C.F.R. §1.78

This non-provisional patent application is a continuation of application Ser. No. 11/712,536, filed Feb. 28, 2007 and further claims priority based upon the following prior U.S. provisional patent application(s): (i) "METHODS AND SYSTEM FOR EFFECTUATING ACCELERATED NETWORK SELECTION IN A RADIO NETWORK ENVIRONMENT," Application No. 60/802,008, filed May 19, 2006, in the name(s) of Adrian Buckley and William Daniel Willey. All priority applications are hereby incorporated by reference.

REFERENCE TO RELATED APPLICATION(S)

This application discloses subject matter related to the subject matter disclosed in the following commonly owned co-pending U.S. patent application(s): (i) "SYSTEM AND METHOD FOR ACCELERATING NETWORK SELECTION BY A WIRELESS USER EQUIPMENT (UE) DEVICE," filed Jul. 1, 2005; application Ser. No. 11/173,083, in the name(s) of: Adrian Buckley, Andrew Allen and G. Scott Henderson, now published as U.S. Patent Publication No. 2007/0004405 and (ii) "SYSTEM AND METHOD FOR ACCELERATING NETWORK SELECTION BY A WIRELESS USER EQUIPMENT (UE) DEVICE USING SATELLITE-BASED POSITIONING SYSTEM," filed Jul. 1, 2005; application Ser. No. 11/173,040, in the name(s) of: Adrian Buckley and G. Scott Henderson, now published as U.S. Patent Publication No. 2007/0004404.

FIELD OF THE DISCLOSURE

The present patent disclosure generally relates to communication networks. More particularly, and not by way of any limitation, the present patent application is directed to a system and method for facilitating accelerated network selection by a wireless user equipment (UE) device.

BACKGROUND

When a wireless user equipment (UE) device is first powered up or when it tries to recover from loss of coverage, it is typically required to search for its last registered Public Land Mobile Network (RPLMN) in every supported radio access technology and frequency bands associated therewith before attempting to register on another PLMN. The issue for operators is that when a UE device powers up after a power off condition and subsequent relocation to a new location, it may have to perform a full band scan (FBS) of all supported bands before possibly selecting a National Roaming Partner (NRP). Today, such a full scan already takes a fairly long time in a dense or complex radio environment, which will be further exacerbated when additional frequency bands are introduced and more access technologies are integrated.

In addition, it is important to note that in most scenarios a full band scan can give rise to inefficient utilization of radio and/or battery resources. Relatedly, the time to perform a full scan may be so long that the radio environment may have changed significantly between the time when the scan was started and the time the UE device decides to select a new PLMN. As a result, by the time the UE decides to select a new network, another high priority network may have appeared again.

BRIEF DESCRIPTION OF THE DRAWINGS

A more complete understanding of the embodiments of the present patent disclosure may be had by reference to the following Detailed Description when taken in conjunction with the accompanying drawings wherein:

FIGS. 2A and 2B depict exemplary embodiments of a database structure for storing system and acquisition tables for facilitating accelerated network selection in accordance with the teachings of the present patent disclosure;

DETAILED DESCRIPTION OF THE DRAWINGS

In one embodiment, the present disclosure is directed to a method for facilitating accelerated network selection by a wireless UE device, comprising: manipulating a searching sequence order relating to a system acquisition database structure that is associated with the wireless UE device based at least in part upon how long the wireless UE device was in power off condition, the system acquisition database having acquisition records for storing scanning data operable with the wireless UE device for discovering a network; and locating a network via scanning by the wireless UE device using scanning data obtained from the system acquisition database structure responsive to the manipulation.

In another embodiment, the present disclosure is directed to a wireless UE device, comprising: means for manipulating a searching sequence order relating to a system acquisition database structure that is associated with the wireless UE device, based at least in part upon how long the wireless UE device was in power off condition, the system acquisition database structure having acquisition records for storing scanning data operable with the wireless UE device for discovering a network; and means for locating a network via scanning by the wireless UE device using scanning data obtained from the system acquisition database structure responsive to the manipulation.

In a still further embodiment, the present disclosure is directed to a storage module (SM) operable to be coupled to or integrated with a wireless UE device. The storage module may be provisioned with a first database portion populated with a plurality of network system identifiers wherein each network system identifier is associated with a corresponding system acquisition index, the network system identifiers being organized on based on one or more geographic regions; and a second database portion populated with system acquisition parametric data including frequency information for each system acquisition index, wherein a search sequence order associated with the acquisition records in the second database portion is operable to be manipulated based on the wireless UE device's expected relocation upon powering down.

Figure 1:
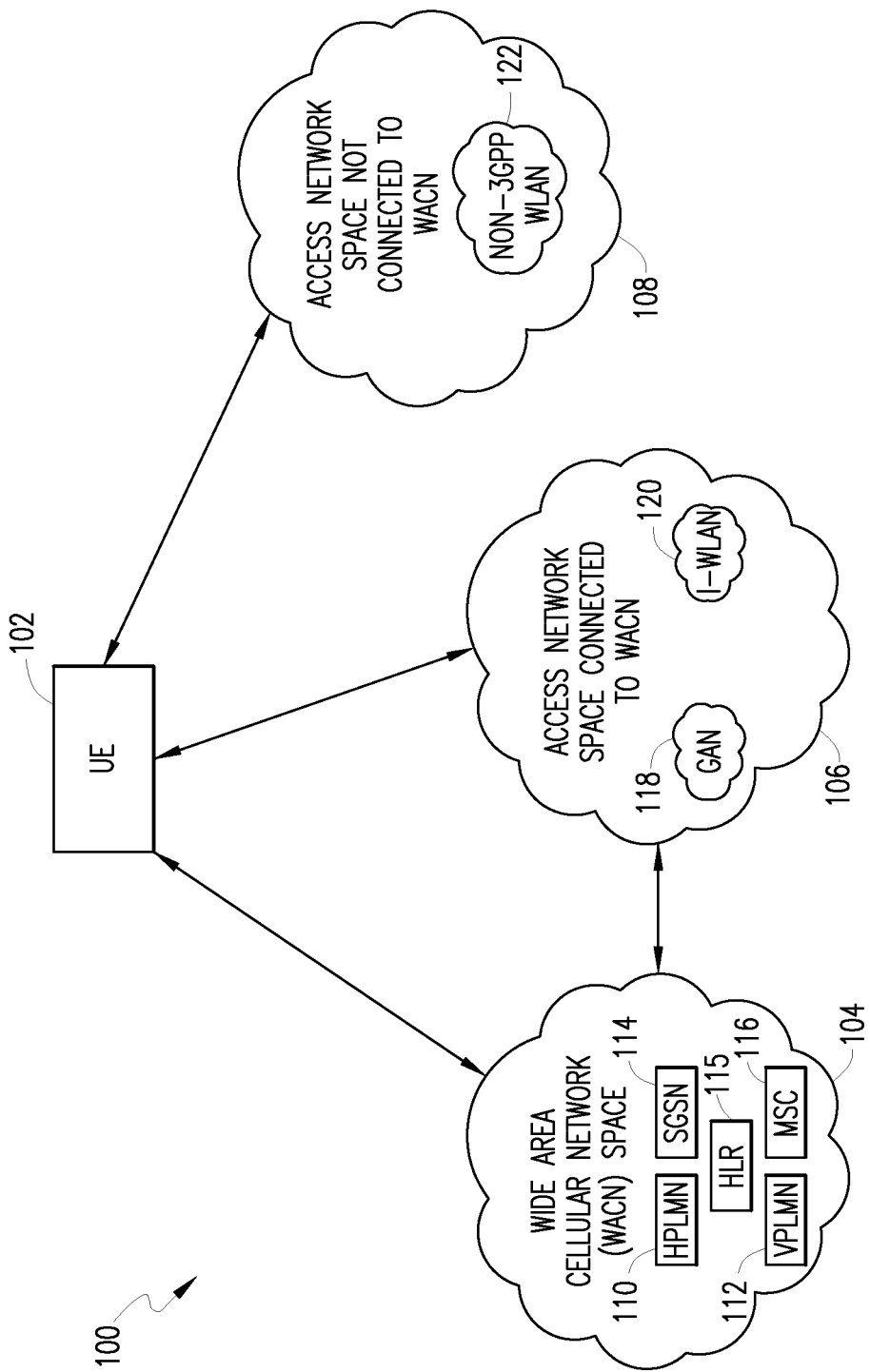
FIG. 1 depicts a generalized radio network environment wherein an embodiment of the present patent disclosure may be practiced when a wireless UE device (e.g., including but not limited to a mobile station (MS) or an access terminal (AT)) is relocated to a new geographic area having the radio network environment.

An apparatus and method of the present patent disclosure will now be described with reference to various examples of how the embodiments can best be made and used. Like reference numerals are used throughout the description and several views of the drawings to indicate like or corresponding parts, wherein the various elements are not necessarily drawn to scale. Referring now to the drawings, and more particularly to FIG. 1, depicted therein is an exemplary generalized radio network environment 100 wherein one or more embodiments of the present patent disclosure may be practiced when a wireless user equipment (UE) device relocates to a new geographic area having the exemplary radio environment. For purposes of the teachings herein, a generalized wireless UE device 102 is deemed to be a mobile equipment (ME) device having a removable storage module, and may comprise any portable computer (e.g., laptops, palmtops, or handheld computing devices) or a mobile communications device (e.g., cellular phones or data-enabled handheld devices capable of receiving and sending messages, web browsing, et cetera), or any enhanced personal digital assistant (PDA) device or integrated information appliance capable of email, video mail, Internet access, corporate data access, messaging, calendaring and scheduling, information management, and the like, that is preferably operable in one or more modes of operation and in a number of frequency bands and/or radio access technologies (RATs). For example, UE device 102 may operate in the cellular telephony band frequencies such as 450 MHz, 700 MHz, 900 MHz, 1800 MHz, 1900 MHz, and 2.4 GHz, etc., as well as Wireless Local Area Network (WLAN) bands. Further, other bands in which the UE device could operate wirelessly may comprise Wi-Max bands or one or more satellite bands. Accordingly, for purposes of the present patent disclosure, those skilled in the art should recognize that the term "UE device" or "wireless device" may comprise a ME device (with or without any removable storage module such as a Universal Subscriber Identity Module (USIM) card, Removable User Identity Module (RUIM) card, a Subscriber Identity Module (SIM) card, or a compact Flash card, Secure Digital (SD) card, etc.) as well as other portable wireless information appliances, also with or without such storage modules.

By way of illustration, the radio network environment 100 is envisioned having as one or more categories of communication spaces capable of providing service to UE device 102 wherein system acquisition data provisioned with the device may be manipulated in accordance with the teachings set forth herein for purposes of facilitating accelerated network selection. In a wide area cellular network (WACN) space 104, there may exist any number of Public Land Mobile Networks (PLMNs) that are operable to provide cellular telephony services which may or may not include packet-switched data services. Depending on the coverage area(s) and whether the user is roaming, WACN space 104 can include a number of home networks 110 (i.e., home PLMNs or HPLMNs, or equivalent HPLMNs or EHPLMNs), visited networks (i.e., VPLMNs) 112, each with appropriate infrastructure such as Home Location Register (HLR) or Home Subscriber Server (HSS) nodes 115, Mobile Switching Center (MSC) nodes 116, and the like. Since the WACN space 104 may also include a General Packet Radio Service (GPRS) network that provides a packet radio access for mobile devices using the cellular infrastructure of a Global System for Mobile Communications (GSM)-based carrier network, a Serving GPRS Support Node (SGSN) 114 is exemplified therein. Additionally, by way of generalization, the PLMNs of the WACN space 104 may comprise radio access and core networks selected from the group comprising Enhanced Data Rates for GSM Evolution (EDGE) networks, Integrated Digital Enhanced Networks (IDENs), Code Division Multiple Access (CDMA) networks, Time Division Multiple Access (TDMA) networks, Universal Mobile Telecommunications System (UMTS) networks, or any 3rd Generation Partnership Project (3GPP)-compliant network (e.g., 3GPP or 3GPP2), e.g., Evolution-Data Optimized (EVDO) networks, all operating with well known technologies, frequency bandwidths and protocols.

Further, UE device 102 is operable to obtain service from an access network (AN) space 106 that is connected to the WACN space 104. In one implementation, the AN space 106 includes one or more generic access networks (GANs) 118 as well as any type of wireless LAN (WLAN) arrangements 120, both of which may be generalized as any wireless AN that is operable to provide access services between UE device 102 and a PLMN core network using a broadband Internet Protocol (IP)-based network. WLAN arrangements 120 provide short-range wireless connectivity to UE device 102 via access points (APs) or "hot spots," and can be implemented using a variety of standards, e.g., IEEE 802.11b, IEEE 802.11a, IEEE 802.11g, IEEE 802.11n, HiperLan and HiperLan II standards, Wi-Max standard (IEEE 802.16 and IEEE 802.16e), OpenAir standard, and the Bluetooth standard (IEEE 802.15), and the like.

Additionally, there may exist an access network (AN) space 108 not interfaced to the WACN space 104 that offers short-range wireless connectivity to UE device 102. For instance, AN space 108 may comprise WLANs 122 offering non-3GPP services, such as communications over "public" access points (hotels, coffee shops, bookstores, apartment buildings, educational institutions, etc., whether free or for fee), enterprise access points, and visited (other enterprise) access points where the user may not be a member of that enterprise but is allowed at least some services.

Based on the foregoing, it should be recognized that the service infrastructure of the radio network environment 100 may be generalized into three broad segments: one or more radio access networks (RANs) (which can include cellular band technologies as well as WLAN technologies), one or more core networks (CNs), and one or more service networks (SNs). Depending on network ownership arrangements and service-level agreements, each RAN may support one or more CNs, each of which in turn may support one or more SNs. Such combinations of infrastructure equipment across multiple owners are sometimes used to create Mobile Virtual Network Operators (MVNOs). In some embodiments, the teachings of the present patent disclosure may equally be applicable to MVNOs as to PLMNs. Since each RAN, CN, or SN may be provided with its own network or system identifier (ID code), numerous RAN-CN-SN combinations may be available in the network environment 100. As will be seen below, regardless of how the exemplary radio network environment 100 to which the user of UE device 102 may have relocated is constituted, scanning/searching sequence order associated with appropriate system acquisition database(s) provisioned with UE device 102 may be advantageously manipulated so as to facilitate accelerated network selection, i.e., without having to perform a time-consuming FBS procedure while attempting to locate a network for service in the exemplary network environment.

Figure 2B:
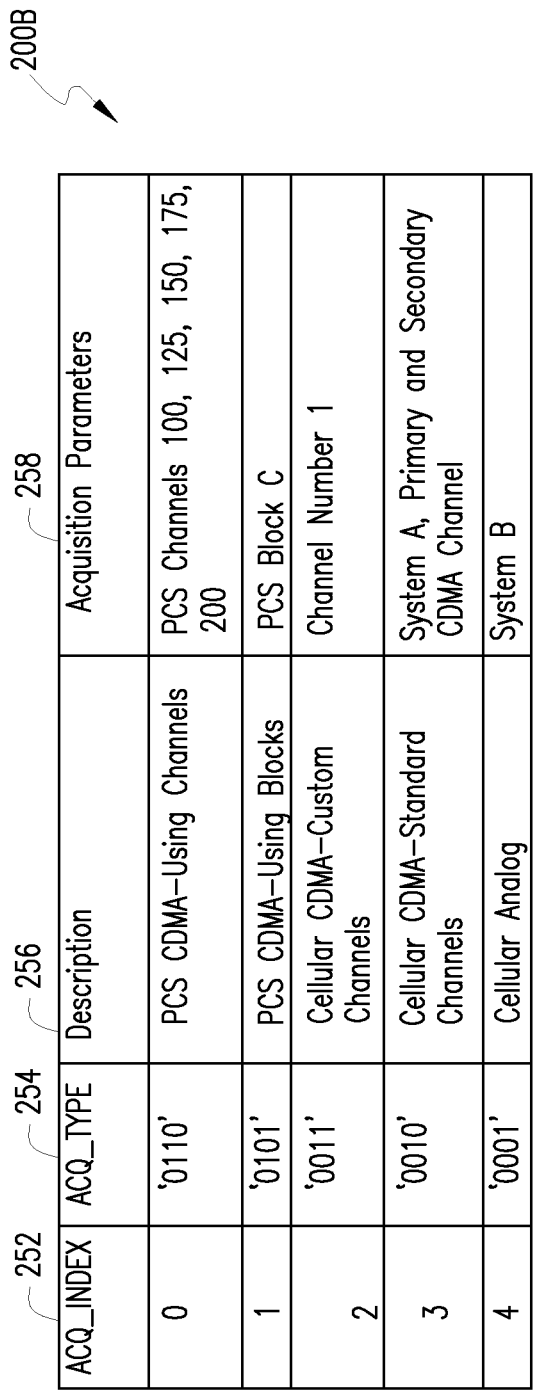

To formalize the teachings of the present disclosure, reference is now taken to FIGS. 2A and 2B wherein exemplary embodiments of database structures that are operable with respect to selecting a CDMA network by a wireless UE device are depicted. Those skilled in the art will recognize that although the exemplary database structures are populated with system acquisition data operable with CDMA technology, the teachings herein are equally applicable to other wide area cellular networks and WLANs, with suitable and/or necessary modifications. Accordingly, the term "network" may encompass various cellular and wireless technologies (e.g., WLAN, WiMax, public safety network implementations, et cetera) at least in some embodiments of the present disclosure. Further, the exemplary database structures of FIGS. 2A and 2B may be implemented in any number ways, either integrated together or not, such as, e.g., linked lists, pointer-based records, etc.

Reference numeral 200A of FIG. 2A refers to an embodiment of a system table database (i.e., a first database portion) that includes various system/network identifiers, priority indicators, preferred/forbidden system identifiers, acquisition record index, roaming indicators, and the like, in what may be termed as system records, each record having a plurality of record fields. The CDMA networks to be used by UE device may be identified by System Identifiers (SIDs) and Network Identifiers (NIDs), where a SID typically covers the area of a city or large town although there are no strict guidelines or requirements for the size of SIDs. Accordingly, their definition may be determined by individual operators and/or national regulatory bodies. A "NID" is an optional subdivision of a SID, where a NID can identify, e.g., different rating areas, toll areas, private networks, MSC boundaries, or any other subdivision that an operator may want to distinguish within a SID. A national operator may have coverage over an entire country, where for certain countries, this can amount to tens and sometimes hundreds of cities/regions being covered. Consequently, a SID column 204 comprises a plurality of SID values that a UE can select from for obtaining service. A NID_INCL column 206 is populated with values, each corresponding to the SID of a record to indicate whether a NID is included or not. Typically, a NID_INCL value of "00" indicates that NID is not included. On the other hand, if the NID_INCL field of a record is set to "01", the NID of the network associated with the record is included. It will be realized by those skilled in the art that Mobile Country Code (MCC) and Mobile Network Code (MNC) combinations may also be used in addition to SID/NID combinations in certain implementations, with appropriate modifications.

A PREF_NEG column 208 is provided to indicate whether a UE device is allowed to operate on the system associated with a particular record. For instance, if the PREF_NEG field of a record is set to "1", the UE device is allowed to operate on the system identified in the record. A geographical region indicator or GEO field 210 is operable to indicate whether a system record is the first record applicable within a region that is identified by a REGION column 202. If a particular record the first system record, this field is set to "0". If the record is not the first system record, then this field may be set as follows. If the system associated with the record is in the same geographical region as the system associated with the previous system record, the field is set to "1". Otherwise, this field is set to "0". A relative priority indicator or PRI field 212 is operable to indicate relative priority of a system within a particular geographical region, and may be dependent on how the PREF_NEG field of a record has been populated. An acquisition record index or ACQ_INDEX column 214 is set to the index of an acquisition record in an acquisition table structure (shown in FIG. 2B and described below) that specifies the acquisition parameters of the system identified in a particular system record. Also associated with ACQ_INDEX is a type description of the system, such as cellular CDMA, PCS CDMA, etc. for example. A roaming indicator or ROAM_IND field 216 may be included in a system record based on whether its PREF_NEG field is set to "1". If included, ROAM_IND field 216 may contain indicators such as On, Off, Flashing, or N/A.

As set forth in the illustrative system table 200A, SIDs of various network systems may be grouped based on geographic regions identified in column 202. A usage flag column 218 is provided to indicate whether a particular region has been considered or not in manipulating an associated acquisition table structure and/or its scanning sequence order, e.g., sorted in a priority order of use, based on estimated relocation of a UE device upon powering off. As will be described in additional detail below, the database/scanning order manipulation process may preferably be predicated upon determining which regions are likely to be the candidates where the UE device may be located when it is powered up after a period of downtime.

Reference numeral 200B of FIG. 2B is illustrative of an exemplary acquisition table structure (i.e., a second database portion) associated with a UE device that is operable to store acquisition records in order of priority according to desired system selection scan order. Typically, highest priority record is placed first, the next highest priority record is placed second, and so on. An ACQ_INDEX value obtained from an appropriate system record of the system table 200A may be used to index into the acquisition table 200B using an ACQ_INDEX column 252 thereof for obtaining a particular acquisition record. An ACQ_TYPE field 254 is encoded suitably according to the description of the system identified in the system table 200A. As exemplified in the acquisition table 200B, a Description field 256 describes the system type. A Parametrics field 258 of the acquisition record includes the scanning data (i.e., band, frequency, channels, etc.) to be used by the UE when attempting to acquire the system.

As one skilled in the art may appreciate, the foregoing database structures may be suitably modified to include a number of different network technologies such that applicable system records and acquisition records may be provisioned with appropriate data. For example, WLANs may be identified by means of Service Set IDs (SSIDs) and GSM networks may be identified by means of MCC/MNC combinations. Further, different networks in a particular technology, e.g., GSM, may support different bands, e.g., selected from 450 MHz, 700 MHz, 850 MHz, 900 MHz, 1800 MHz, and 1900 MHz. Likewise, CDMA technology (TIA-2000, TIA-856)) networks may operate in 850 MHz and 1900 MHz, and other bands. In addition, there may be more than one system and acquisition table provisioned for a UE device, which may be integrated into a single database. As to storage, the database structures may be embodied in a removable module such as SIM, RUIM, USIM, Flash memory, SD card, or a storage memory circuit integrated within the UE device.

Based on the foregoing, an embodiment of the present disclosure for facilitating accelerated network selection may be set forth as follows. When a wireless UE device powers on, it will determine the order in which to scan technologies and bands based on the amount of time the device has been powered off and the location it was powered off. An estimate of the distance the user of the device could have traveled from the location where the UE device was powered off is related to, inter alia, the amount of time it has been turned off and an estimated mode of travel (e.g., air travel, surface travel, etc. and estimates of speed respectively associated therewith). The mode of travel may be estimated based on additional location information such as whether the UE was turned off at an airport, etc. Based on which technologies and bands are to be used in various geographic regions, the search sequence orders associated with system acquisition database structures of the UE device are sorted or prioritized (i.e., manipulated) accordingly so that network selection is customized and, consequently, accelerated.

Figure 3:
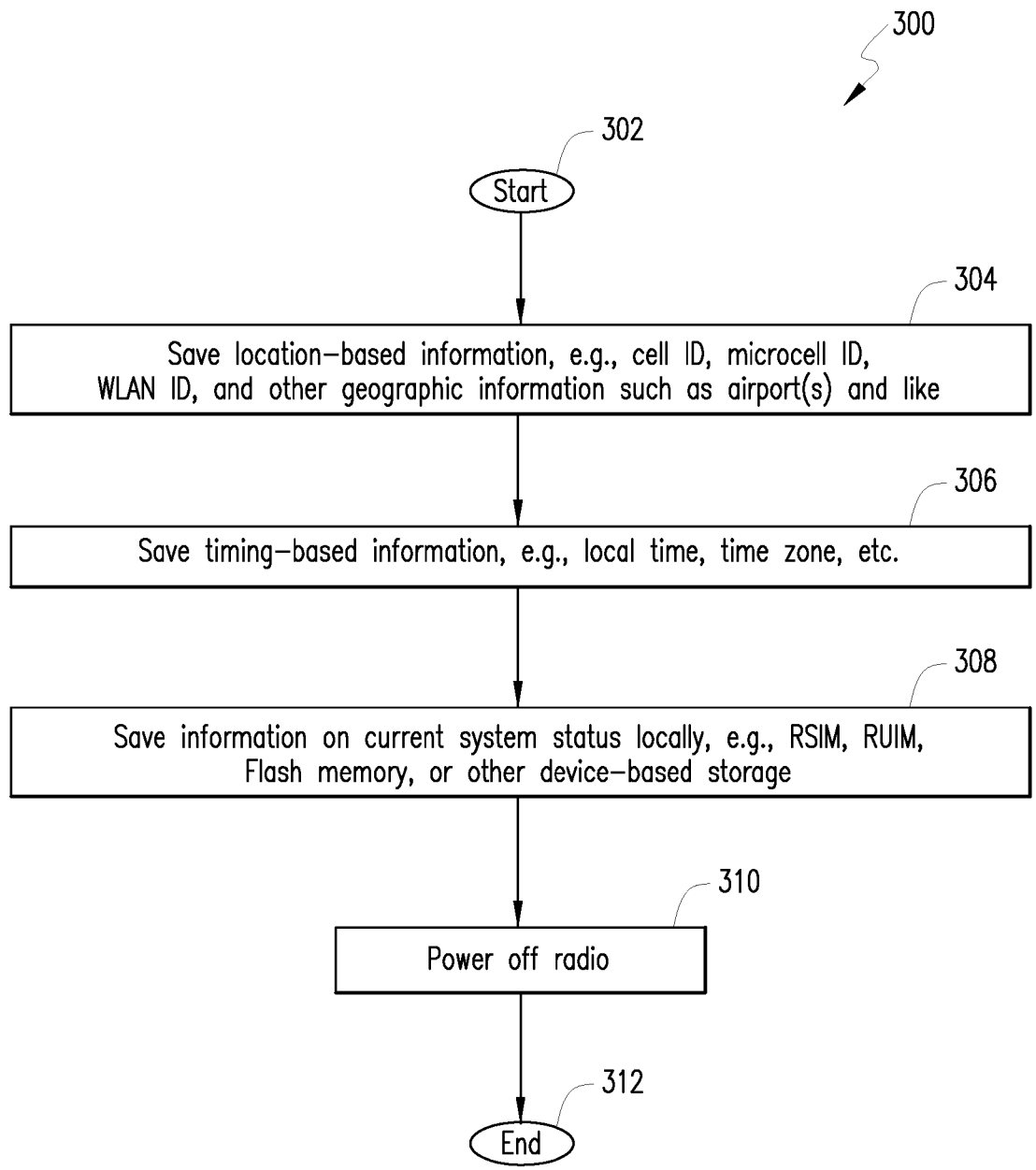
FIG. 3 is a flowchart of an exemplary methodology for saving various system, location and timing data when a wireless UE device is powered off.

FIG. 3 is a flowchart of an exemplary methodology 300 for saving various pieces of network system, location and timing information when a wireless UE device is powered off. The methodology 300 is initiated as the UE device is about to enter into a power off state (block 302), whereupon location-based information, e.g., cell ID, macrocell ID, WLAN ID, longitude and latitude, and other geographic information such as airport(s) and the like is saved locally (block 304). Timing-based information, e.g., local time, time zone, etc. is also saved (block 306). One skilled in the art will appreciate that the time data may be provided by an internal clock of the UE device, by means of GPS, or from the serving network. As illustrated in block 308, saved location/system/timing information may be embodied in a removable module such as SIM, RUIM, USIM, Flash memory, or a storage memory circuit integrated within the UE device. The system information may comprise the technology and frequency band(s) being used at the time of powering off. Although not shown, the UE device may also store the current battery level and an indication if the device powered off due to a low battery condition, preferably so as to avoid manipulating the acquisition records due to false relocation indications. Upon saving the data, the UE device is then powered off (block 310). Thereafter, the process flow terminates (block 312).

Figure 4:
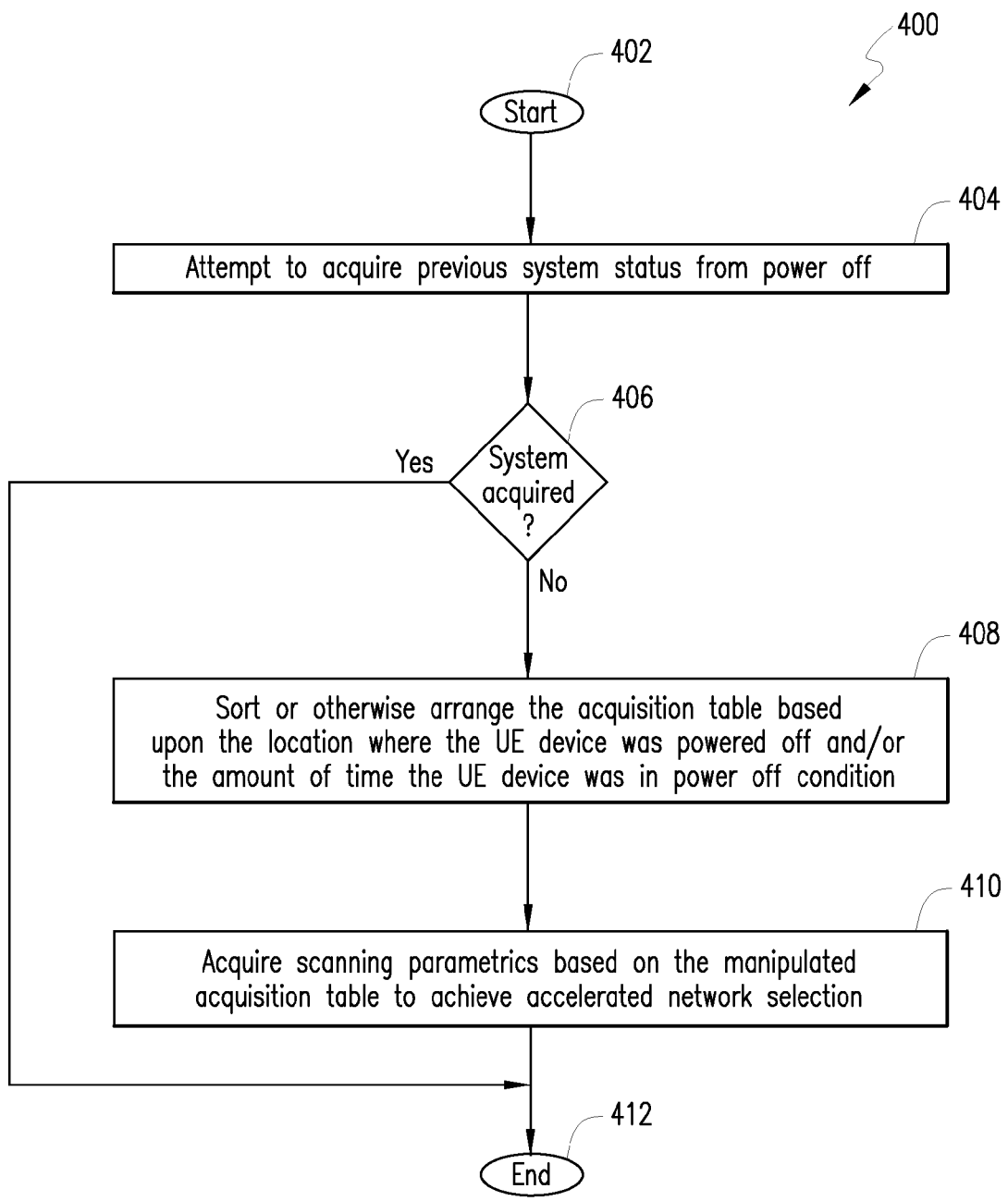
FIG. 4 is a flowchart of an exemplary embodiment of an overall scheme for facilitating accelerated network selection when a wireless UE device is powered up.

FIG. 4 is a flowchart of an exemplary embodiment of an overall scheme 400 for facilitating accelerated network selection when a wireless UE device is powered up. The process flow of scheme 400 is initiated as the UE device is determined to be in a power up state (block 402), whereupon the UE device attempts to acquire the previous system using the status data that was saved when it was powered off (block 404). Appropriate logic provided with the UE device is operable to determine whether the saved system has been acquired (block 406). In one variation, such a determination may be made without regard to whether the UE device has relocated or not. If the network system can be acquired, the UE device proceeds with obtaining service in normal fashion and the process flow terminates (block 412). On the other hand, if the saved system status data is not usable for finding a network, the system acquisition database structure and/or its search sequence order list is sorted or otherwise manipulated based on estimated new location (e.g., re-mapping of pointers, etc.), which in turn may depend on the location where the UE device was powered off and/or the amount of the UE device was in the power off condition (block 408). As will be described in greater detail below, this process may be realized in a number of different embodiments. Preferably, the database/search order list manipulation is operable to result in a sequence of acquisition records such that the records relating to networks that are more likely to be available at the new location are placed at or near the top of the table, logically speaking. In other words, the manipulation need not necessarily result in a physically-sorted database structure, since the end result could be effectuated by means of re-mapping the search order list associated therewith. Thereafter, scanning parameters (i.e., frequency data) from the "manipulated" acquisition records are utilized by the UE device, preferably in accordance with the rearranged priority order, in acquiring or locating a network (block 410).

Figure 5A:
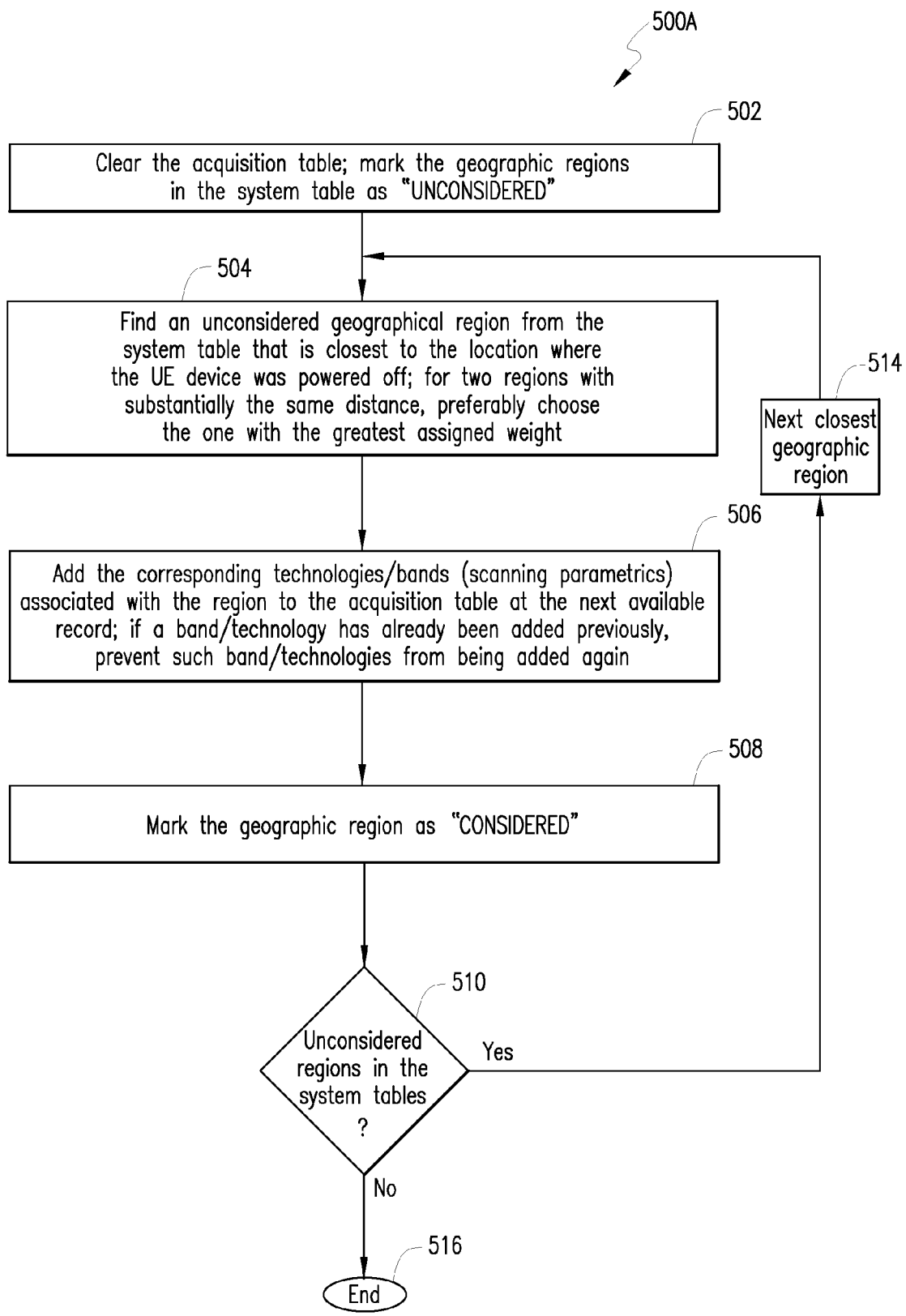
FIG. 5A is a flowchart of an embodiment for manipulating the system acquisition database structure(s) associated with a wireless UE device.

FIG. 5A is a flowchart of an embodiment of a scheme 500A for manipulating the system acquisition database structure(s) associated with a wireless UE device. The process flow of scheme 500A begins with temporarily clearing the acquisition table and marking the geographic regions of the system table as "UNCONSIDERED". Preferably, an indicator such as the flag column 218 of the system table 200A (shown in FIG. 2A) may be utilized for this purpose. A determination is made to find an unconsidered geographic region from the system table that is closest to the location where the UE device was powered off. Any suitable metric or measurement may be utilized for computing distances for purposes of the present disclosure. For example, a latitude/longitude combination may be associated with each region in the table and the distance could be determined based upon computing distance between the latitude/longitude pairs. Where two or more regions are determined to be at identical or substantially the same distance from the power off location, preferably the region with the greatest assigned weight (either predetermined, pre-assigned, dynamically determined, or otherwise) may be chosen (block 504). Thereafter, the scanning parametric data including the network technologies, frequency bands, etc. associated with the selected region (obtained from a saved copy of the database) are added to the acquisition table at the next available record location, which starts at the top of the table initially. In one embodiment, if a band or technology has already been added previously, they are not added again in order to avoid duplication of scanning (block 506). The geographic region that has been analyzed as set forth above is then marked "CONSIDERED", again appropriately controlling a flag mechanism as alluded to before (block 508). This process of geographic region analysis is performed iteratively, as illustrated in blocks 510 and 514, until all the regions of the system table of the UE device are covered. It will be realized by those skilled in the art that no new data tables need be created in the foregoing process. Rather, associated pointers etc. may be appropriately manipulated to achieve the same result. Thereafter, the process flow terminates (block 516), resulting in an acquisition table that is populated with ordered acquisition records.

Figure 5B:
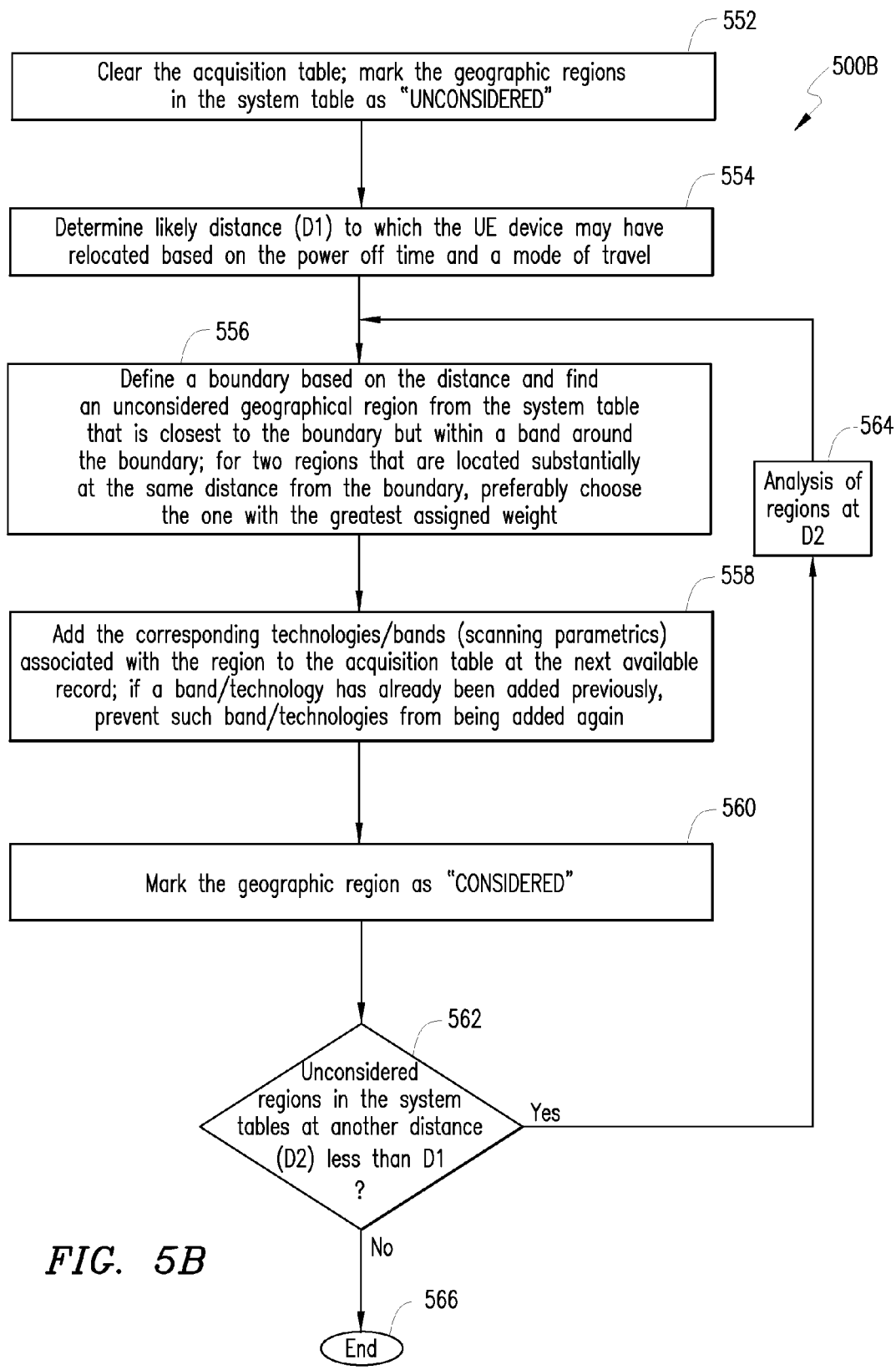
FIG. 5B is a flowchart of another embodiment for manipulating the system acquisition database structure(s) associated with a wireless UE device.

It will be appreciated that the scheme 500A described hereinabove does not require an estimate of distance traveled in order to manipulate the acquisition table(s) associated with the UE device since the methodology involves concentrically expanding away from the power off location. Referring now to FIG. 5B, depicted therein is a flowchart of another embodiment 500B for manipulating the system acquisition database structure(s) associated with a wireless UE device based on relocation estimation. As before, the process flow of embodiment 500B begins with clearing the acquisition table and marking the geographic regions of the system table as "UNCONSIDERED" using a suitable flag mechanism. A determination is made with respect to the likely distance to which the UE device may have relocated based on the power off time and an estimated mode of travel (block 554). As pointed out previously, various geographic location and speed data (GPS locations of airports, airport codes, estimates of average speeds for different types of transportation, and the like) as well as time-based information may be used in any suitable computational technique to estimate the likely distance, D1. A boundary is defined based on the estimated likely distance. As a further variation, a geographical band may be circumscribed around the boundary at D1. A computation is made to find an unconsidered geographic region from the system table that is closest to the boundary at D1 but within the band defined around it. Again, any suitable metric or measurement may be utilized for computing distances for purposes of the present embodiment. Where two or more regions are determined to be at identical or substantially the same distance, preferably the region with the greatest assigned weight (e.g., predetermined or otherwise) may be chosen (block 556). Thereafter, the scanning parametric data including the network technologies, frequency bands, etc. associated with the selected region are added to the acquisition table at the next available record location, starting at the top of the table. Again, if a band or technology has already been added, they may not be added again in order to avoid duplication of scanning (block 558). The geographic region that has been analyzed as set forth above is then marked "CONSIDERED" (block 560). This process of geographic region analysis is performed iteratively with shrinking distances (i.e., moving toward the power off location), as illustrated in blocks 562 and 564, until all the regions of the system table of the UE device are covered. Thereafter, the process flow terminates (block 566), whereupon the UE device may commence scanning based on the frequency data obtained from the acquisition table that has been populated with ordered acquisition records.

Based upon the foregoing, it will be appreciated that in one exemplary scenario, schemes 500A and 500B may be selectively chosen depending on whether the UE device was near an airport at the time of power-off. For instance, scheme 500B may be utilized if the power-off was detected near an airport whereas scheme 500A may be implemented if the UE device was not near an airport.

Figure 6:
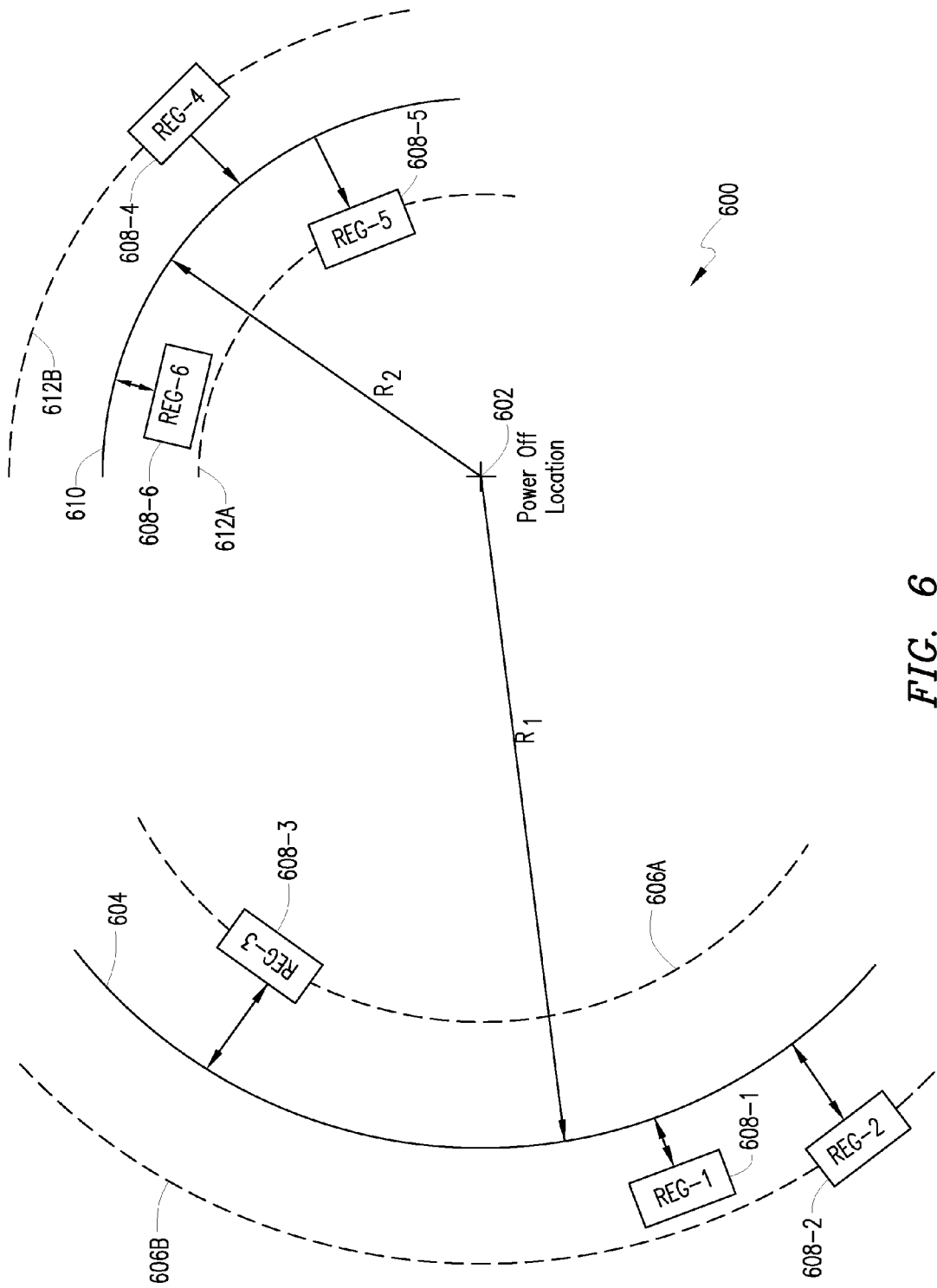
FIG. 6 is an exemplary geographic region layout illustrative of the teachings of FIG. 5B.

FIG. 6 is an exemplary hypothetical geographic region layout 600 illustrative of the teachings of FIG. 5B. A distance of radius R1 is computed from a power off location 602 based on estimated mode of travel and the duration of power off. A circular boundary 604 and a band having an inner limit 606A and an outer limit 606B around the boundary 604 are then delimited, thereby defining an annular geographic area. Three regions of a system table, REG-1 608-1, REG-2 608-2, and REG-3 608-3, are illustrated with respect to this annular area, wherein REG-1 608-1 is closest to the boundary 604. It is this region that becomes "CONSIDERED" and the scanning data associated therewith are added to the UE device's acquisition table at the available record location(s). A next distance of radius R2, where R2<R1, is then computed, whereupon a new boundary 610 and associated annular area delimited by inner and outer borders 612A, 612B, respectively, are defined. Three other regions of the system table, REG-4 608-4, REG-5 608-5, and REG-6 608-6, are illustrated with respect to this annular area, wherein REG-6 608-6 is closest to the boundary 610. The scanning parametric data relating to REG-6 608-6 are then added to the acquisition table. It should be appreciated that a previously analyzed, but remained unconsidered, geographic region of the system table may be included in the distance analysis again, especially if there is some geographical overlap between two successive iterations. Accordingly, REG-3 608-3, for example, may appear in computations with respect to both R1 as well as R2 in some arrangements.

Figure 7:
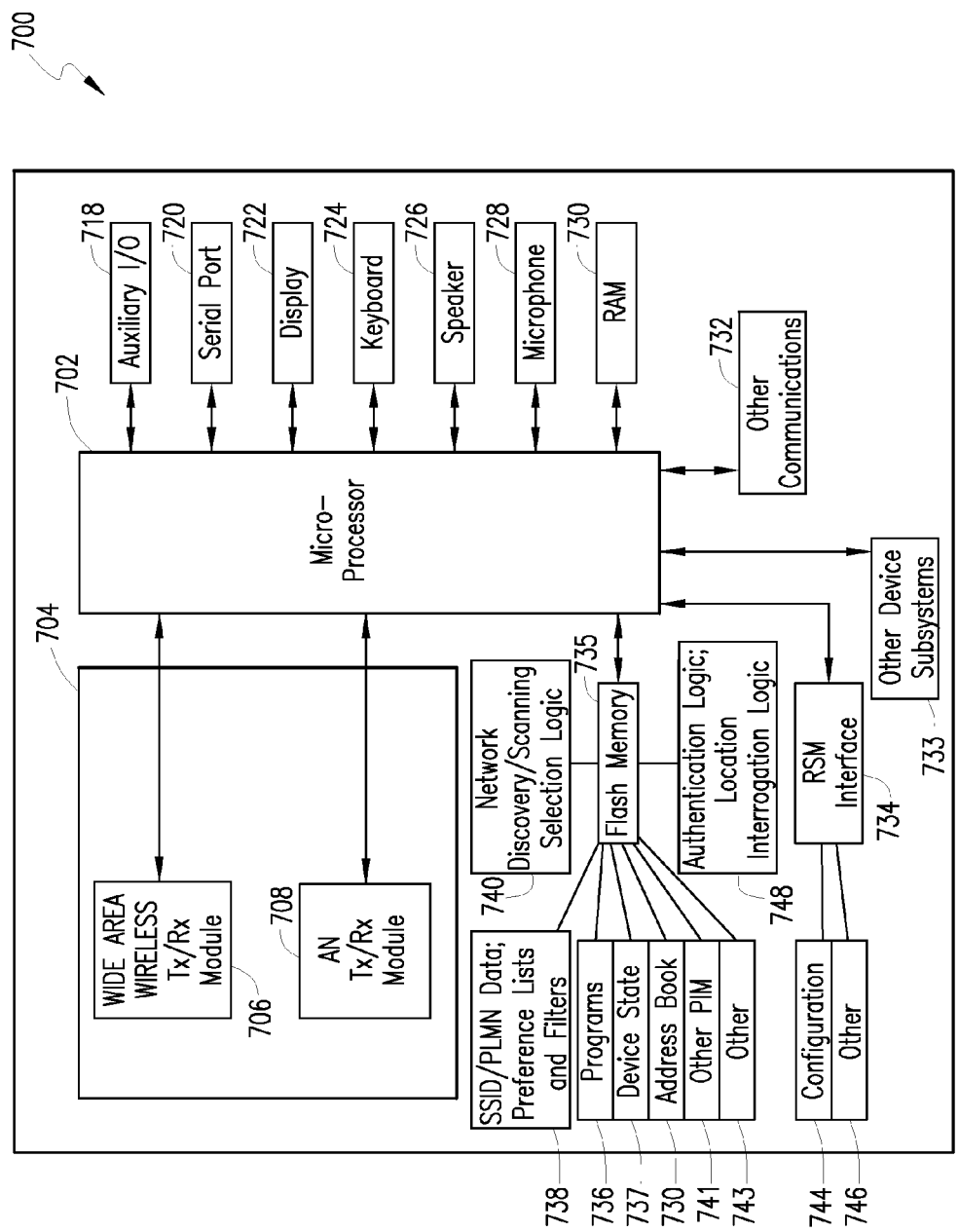
FIG. 7 depicts a block diagram of an embodiment of a wireless UE device operable to accelerate network selection according to the teachings of the present patent disclosure.

FIG. 7 depicts a block diagram of an embodiment of a wireless device or UE/ME device 700 operable to accelerate network selection according to the teachings of the present patent disclosure. It will be recognized by those skilled in the art upon reference hereto that although an embodiment of UE 102 may comprise an arrangement similar to one shown in FIG. 7, there can be a number of variations and modifications, in hardware, software or firmware, with respect to the various modules depicted. Further, a UE device for purposes of the present disclosure may comprise a mobile equipment (ME) device without a removable storage module and/or a mobile device coupled with such a storage module. Accordingly, the arrangement of FIG. 7 should be taken as illustrative rather than limiting with respect to the embodiments of the present patent disclosure. A microprocessor 702 providing for the overall control of UE 700 is operably coupled to a communication subsystem 704 which includes transmitter/receiver (transceiver) functionality for effectuating multi-mode scanning and communications over a plurality of bands. By way of example, a wide area wireless Tx/Rx module 706 and a wireless AN Tx/Rx module 708 are illustrated. Although not particularly shown, each Tx/Rx module may include other associated components such as one or more local oscillator (LO) modules, RF switches, RF bandpass filters, A/D and D/A converters, processing modules such as digital signal processors (DSPs), local memory, etc. As will be apparent to those skilled in the field of communications, the particular design of the communication subsystem 704 may be dependent upon the communications networks with which the UE device is intended to operate. In one embodiment, the communication subsystem 704 is operable with both voice and data communications.

Microprocessor 702 also interfaces with further device subsystems such as auxiliary input/output (I/O) 718, serial port 720, display 722, keyboard 724, speaker 726, microphone 728, random access memory (RAM) 730, a short-range communications subsystem 732, and any other device subsystems generally labeled as reference numeral 733. To control access, a removal storage module or RSM (SIM/RUIM/USIM) interface 734 is also provided in communication with the microprocessor 702. In one implementation, RSM interface 734 is operable with an RSM card having a number of key configurations 744 and other information 746 such as identification and subscriber-related data as well as one or more system tables and acquisition tables described in detail hereinabove, as well as preferred/forbidden SSID/PLMN lists, network weights, filters and other databases where applicable.

Operating system software and other control software may be embodied in a persistent storage module (i.e., non-volatile storage) such as Flash memory 735. In one implementation, Flash memory 735 may be segregated into different areas, e.g., storage area for computer programs 736 as well as data storage regions such as device state 737, address book 739, other personal information manager (PIM) data 741, and other data storage areas generally labeled as reference numeral 743. Additionally, appropriate network discovery/scanning selection logic 740 (including, e.g., searching sequence order lists and associated structures) may be provided as part of the persistent storage for executing the various network discovery/scanning and accelerated selection procedures set forth in the preceding sections. Additionally or alternatively, another logic module 748 may be provided for facilitating home network authentication, location interrogation, etc. Associated therewith is a storage module 738 for storing the SSID/PLMN lists, location-based selection and/or scanning filters, capability indicators, et cetera.

In view of the teachings set forth herein, the various logic blocks of wireless UE device 700 should be understood as comprising at least the following: a logic structure for manipulating a system acquisition database structure and/or its search order list associated with the wireless UE device based at least in part upon where the wireless UE device was last powered off and how long the wireless UE device was in power off condition, the system acquisition database structure having acquisition records for storing frequency scanning data operable with the wireless UE device for discovering a network; and a logic structure for locating a network via scanning by the wireless UE device using frequency scanning data obtained from the system acquisition database structure that has been manipulated. Additionally, the various embodiments of computational techniques described hereinabove may be implemented in suitable software/firmware associated with the UE device 700.

It is believed that the operation and construction of the embodiments of the present patent application will be apparent from the Detailed Description set forth above. While the exemplary embodiments shown and described may have been characterized as being preferred, it should be readily understood that various changes and modifications could be made therein without departing from the scope of the present disclosure as set forth in the following claims.

What is claimed is:

1. A method performed by a wireless user equipment (UE) device for facilitating accelerated network selection, the method comprising:
   storing information on the UE device regarding power-off time and power-off location as the UE device is about to enter a power-off condition, the power-off location comprising identification of a current access point; and
   upon power-up, the UE device performing the following actions:
      computing an estimated distance that the UE device has traveled while in the power-off condition using the stored information and a current time,
      defining a boundary that lies the estimated distance from a location indicated by the power-off location,
      for a plurality of regions lying within the boundary, sorting or logically sequencing acquisition records that are associated with the regions in a system acquisition database structure, the sorting or logically sequencing being based on the regions nearness to the boundary, and
      locating a network via scanning using scanning data obtained from the logically sequenced acquisition records.

2. The method as recited in claim 1, wherein computing the estimated distance is further based on an estimated mode of travel and an estimated speed associated with the mode of travel.

3. The method as recited in claim 2, wherein the mode of travel is estimated by determining that the wireless UE device was turned off in an airport.

4. The method as recited in claim 1, wherein the scanning data includes frequency band information that is compliant with at least one of IEEE 802.11 standard, HiperLan standard, HiperLan II standard, Wi-Max standard, OpenAir standard, and Bluetooth standard.

5. The method as recited in claim 1, wherein the scanning data includes frequency band information that is compliant with at least one of a General Packet Radio Service (GPRS) network, an Enhanced Data Rates for Global System for Mobile Communications (GSM) Evolution (EDGE) network, a 3rd Generation Partnership Project (3GPP)-compliant network, an Integrated Digital Enhanced Network (IDEN), a Code Division Multiple Access (CDMA) network, a Universal Mobile Telecommunications System (UMTS) network, a 3GPP2 network, and a Time Division Multiple Access (TDMA) network.

6. The method as recited in claim 1, wherein the system acquisition database structure is provided as part of a Universal Subscriber Identity Module (USIM) card, Removable User Identity Module (RUIM) card, a Subscriber Identity Module (SIM) card, a compact Flash card, a Secure Digital (SD) card, or a memory circuit associated with the wireless UE device.

7. The method as recited in claim 1, further comprising:
   saving network system data operable with the wireless UE device as the UE device is about to enter the power-off condition; and
   upon power-up and prior to the computing, defining and sequencing, determining if a network can be acquired using the saved network system data.

8. The method as recited in claim 1, wherein the information regarding power-off location includes at least one of cell ID, microcell ID, WLAN ID.

9. The method as recited in claim 1, further comprising storing one of information regarding battery level and an indicator if the UE device was powered off due to a low-battery condition.

10. The method as recited in claim 1, wherein if two regions are the same distance from the boundary, a region having a greater weight is logically sequenced ahead of a remaining region.

11. A wireless user equipment (UE) device comprising:
   a microprocessor operably coupled to a transceiver and to a memory;
   instructions, stored in the memory, for storing information on the UE device regarding power-off time and power-off location as the UE device is about to enter a power-off condition, the power-off location comprising identification of a current access point; and
   instructions, stored in the memory and operable upon power-up, for the UE to perform the following actions:
      computing an estimated distance that the UE device has traveled while in the power-off condition using the stored information and a current time,
      defining a boundary that lies the estimated distance from a location indicated by the power-off location,
      sorting or logically sequencing acquisition records in a system acquisition database structure that are associated with regions lying within the boundary, the sorting or logical sequencing being based on a nearness to the boundary of the regions, and
      locating a network via scanning using scanning data obtained from the logically sequenced acquisition records.

12. The wireless UE device as recited in claim 11, wherein the instructions for computing the estimated distance further comprises estimating a mode of travel and an estimated speed associated with the mode of travel.

13. The wireless UE device as recited in claim 12, wherein the instructions for computing the estimated distance estimates the mode of travel by determining that the wireless UE device was turned off in an airport.

14. The wireless UE device as recited in claim 11, wherein the scanning data includes frequency band information that is compliant with at least one of IEEE 802.11 standard, HiperLan standard, HiperLan II standard, Wi-Max standard, OpenAir standard, and Bluetooth standard.

15. The wireless UE device as recited in claim 11, wherein the scanning data includes frequency band information that is compliant with at least one of a General Packet Radio Service (GPRS) network, an Enhanced Data Rates for Global System for Mobile Communications (GSM) Evolution (EDGE) network, a 3rd Generation Partnership Project (3GPP)-compliant network, an Integrated Digital Enhanced Network (IDEN), a Code Division Multiple Access (CDMA) network, a Universal Mobile Telecommunications System (UMTS) network, a 3GPP2 network, and a Time Division Multiple Access (TDMA) network.

16. The wireless UE device as recited in claim 11, wherein the system acquisition database structure is provided as part of a Universal Subscriber Identity Module (USIM) card, a Removable User Identity Module (RUIM) card, a Subscriber Identity Module (SIM) card, a compact Flash card, a Secure Digital (SD) card, or a memory circuit associated with the wireless UE device.

17. The wireless UE device as recited in claim 11, further comprising:
    instructions for saving network system data operable with the wireless UE device as the UE device is about to enter the power-off condition; and
    instructions, operable upon power-up and prior to performing the computing, defining and sequencing, for determining if a network can be acquired using the saved network system data.

18. The wireless UE device as recited in claim 11, wherein the information regarding power-off location includes at least one of cell ID, macrocell ID, WLAN ID and longitude and latitude.

19. The wireless UE device as recited in claim 11, further comprising storing one of information regarding battery level and an indicator if the UE device was powered off due to a low-battery condition.

20. The wireless UE device as recited in claim 11, wherein if two regions are the same distance from the boundary, the instructions for logically sequencing acquisition records logically sequences a region having a greater weight ahead of a remaining region.

* * * * *

UNITED STATES PATENT AND TRADEMARK OFFICE
CERTIFICATE OF CORRECTION

PATENT NO. : 9,119,139 B2  
APPLICATION NO. : 13/859834  
DATED : August 25, 2015  
INVENTOR(S) : William Daniel Willey and Adrian Buckley Page 1 of 1

It is certified that error appears in the above-identified patent and that said Letters Patent is hereby corrected as shown below:

In the Claims

In Column 14, Line 7, In Claim 18, delete "macrocell" and insert -- microcell --, therefor.

Signed and Sealed this
Fifth Day of January, 2016

Michelle K. Lee
*Director of the United States Patent and Trademark Office*